United States Patent
Ledesma et al.

(10) Patent No.: US 11,852,225 B2
(45) Date of Patent: Dec. 26, 2023

(54) CORE RING FOR TORQUE CONVERTER

(71) Applicant: SCHAEFFLER TECHNOLOGIES AG & CO. KG, Herzogenaurach (DE)

(72) Inventors: Diego Alejandro Ledesma, Puebla (MX); Andres Cuevas, Puebla (MX); Juan Pablo Cazares, Puebla (MX)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/734,649

(22) Filed: May 2, 2022

(65) Prior Publication Data
US 2023/0349455 A1 Nov. 2, 2023

(51) Int. Cl.
F16H 41/28 (2006.01)

(52) U.S. Cl.
CPC .................... *F16H 41/28* (2013.01)

(58) Field of Classification Search
CPC .......... F16H 41/28; F16H 33/18; F16H 33/20; B23P 15/006; B23P 15/04; B23P 2700/13; Y10T 29/49321; Y10T 29/49922
USPC ................. 416/197 C, 180; 60/367
See application file for complete search history.

(56) References Cited

U.S. PATENT DOCUMENTS

| | | | | |
|---|---|---|---|---|
| 5,771,691 A | * | 6/1998 | Kirkwood | F16H 41/28 60/345 |
| 2015/0128418 A1 | * | 5/2015 | Okamura | F16H 41/04 29/889.5 |
| 2015/0267795 A1 | * | 9/2015 | Gurney | F16H 41/24 415/213.1 |
| 2016/0305523 A1 | * | 10/2016 | Depraete | F16H 41/28 |
| 2017/0030450 A1 | * | 2/2017 | Boigegrain | F16H 41/04 |
| 2017/0175865 A1 | * | 6/2017 | Schrader | F16H 41/28 |
| 2017/0261083 A1 | * | 9/2017 | Hepler | F16H 45/02 |
| 2017/0299030 A1 | * | 10/2017 | Fujino | F16H 41/28 |
| 2018/0259047 A1 | * | 9/2018 | Hess | F01D 5/30 |
| 2019/0301580 A1 | * | 10/2019 | Durham | F16H 41/04 |
| 2020/0256441 A1 | * | 8/2020 | Keller | F01D 5/323 |

FOREIGN PATENT DOCUMENTS

| | | |
|---|---|---|
| JP | 07-054958 A | 2/1995 |
| JP | 2016-033386 A | 3/2016 |
| JP | 2017-190854 A | 10/2017 |
| KR | 10-0597617 B1 | 7/2006 |

* cited by examiner

Primary Examiner — Christopher Verdier
Assistant Examiner — Ryan C Clark
(74) Attorney, Agent, or Firm — Volpe Koenig

(57) ABSTRACT

A core ring for a torque converter is disclosed herein. The core ring includes a plurality of through openings and a plurality of recesses each connected to a respective through opening of the plurality of through openings. The recesses are each dimensioned to receive a portion of a blade, and specifically a blade tip formed on an adjacent torque converter component.

19 Claims, 6 Drawing Sheets

CORE RING FOR TORQUE CONVERTER

FIELD OF INVENTION

The present disclosure relates to a torque converter.

BACKGROUND

Torque converter assemblies are well known. Within torque converter assemblies, core rings are provided that are generally configured to be attached to another portion of the torque converter, such as a turbine, impeller, pump, etc.

Core rings can generally include openings that are configured to receive a portion of another or adjacent component of the torque converter such that the core ring and the other component are joined or retained with each other. Known methods for securing the core ring with other components of the torque converter include bending a portion of a blade or blade tip such that it is retained with the core ring. However, the connection between the core ring and the other torque convert component can be complicated due to incorrect positioning of the blade tips. Additionally, bending the blade tips over the core ring necessarily results in a configuration having a larger axial footprint or envelope due to the stacking of the blade tip onto the core ring surface.

It would be desirable to provide a reliable configuration that is uncomplicated to assemble and also provides a reduced axial footprint or envelope between the core ring and an adjoining torque converter component.

SUMMARY

A core ring for a torque converter assembly is disclosed herein. The core ring includes a plurality of through openings and a plurality of recesses each connected to a respective through opening of the plurality of through openings. The plurality of recesses are each dimensioned to receive a portion of a blade. The plurality of recesses are each configured to extend in a common circumferential direction from a respective one of the plurality of through openings.

Each of the plurality of recesses includes a first flank and a second flank connected via a medial portion. The first flank and the second flank can each have a straight profile. The medial portion can have a curved profile.

The portion of the blade received within the recess can be a blade tip, in one aspect. Each of the recesses can have a first profile, and the blade tip can have a second profile that is complementary to the first profile.

A depth of the recesses can be between 10%-35% of a thickness of the blade tip. Various dimensions of the recesses and the blade tips can vary depending on the particular application.

A turbine can also be provided that includes blades defining blade tips configured to extend through a respective one of the through openings. The blade tips are configured to be bent and received within a respective one of the recesses.

The blade tips can each be configured to engage against an axial surface of the plurality of recesses.

A method of assembling a torque converter assembly is also disclosed herein. The method can include arranging a core ring adjacent to a turbine, and inserting blade tips formed on the turbine into a respective through openings on the core ring. The method can include bending the blade tips such that the blade tips are at least partially received within a respective one of the recesses formed on the core ring. This method can be applied or adapted to other parts of a torque converter assembly besides the turbine.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
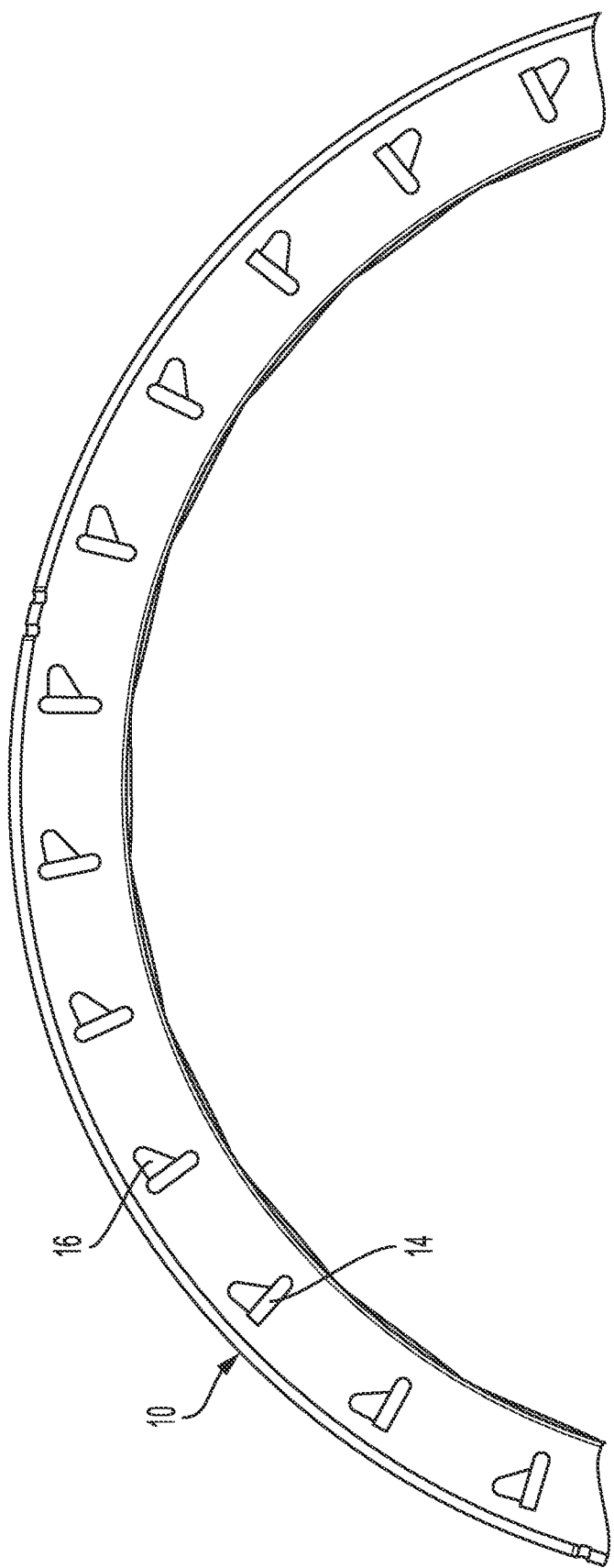
FIG. 1 is a front view of a core ring.
Figure 2:
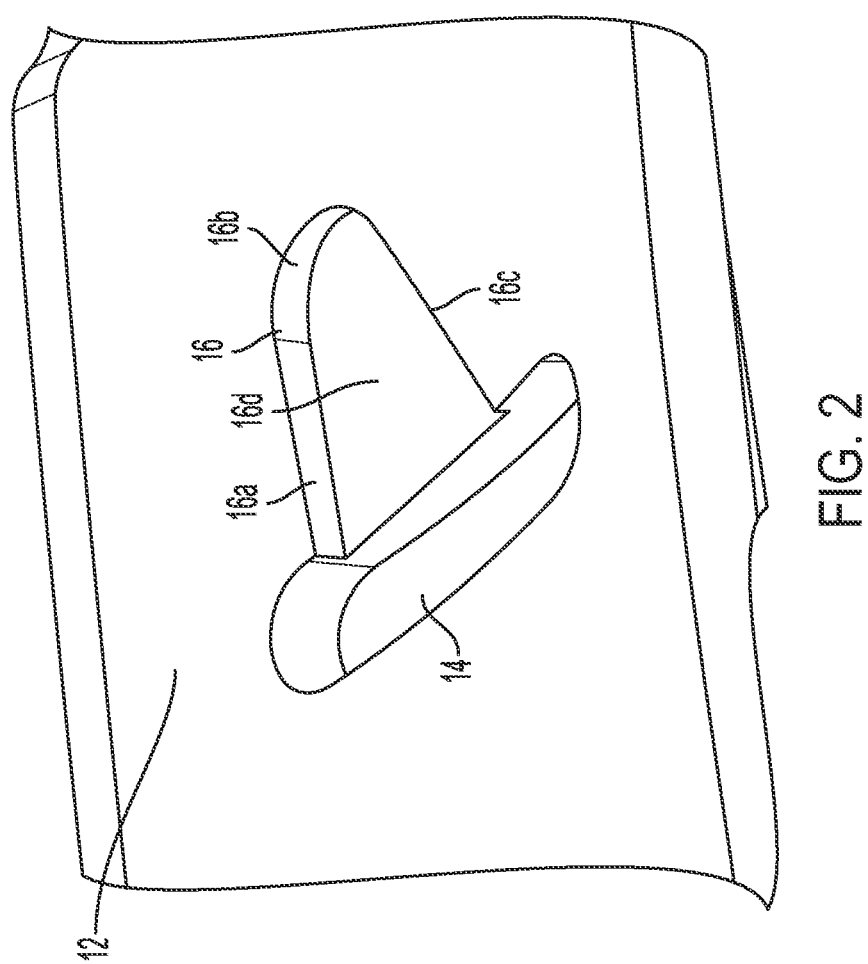
FIG. 2 is a magnified perspective view of a portion of the core ring including a recess.
Figure 3:
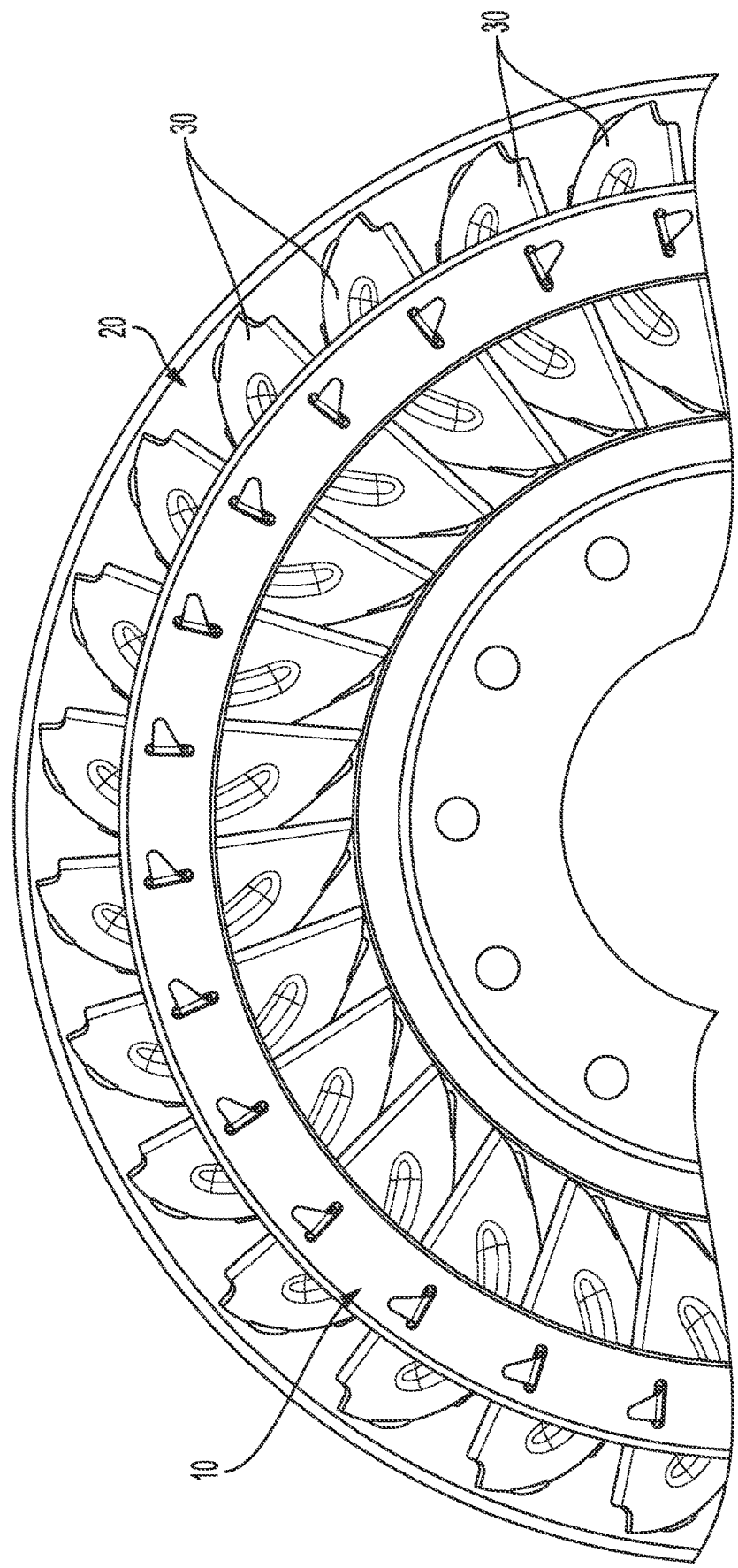
FIG. 3 is a front view of the core ring and a turbine in a partially assembled state.
Figure 5:
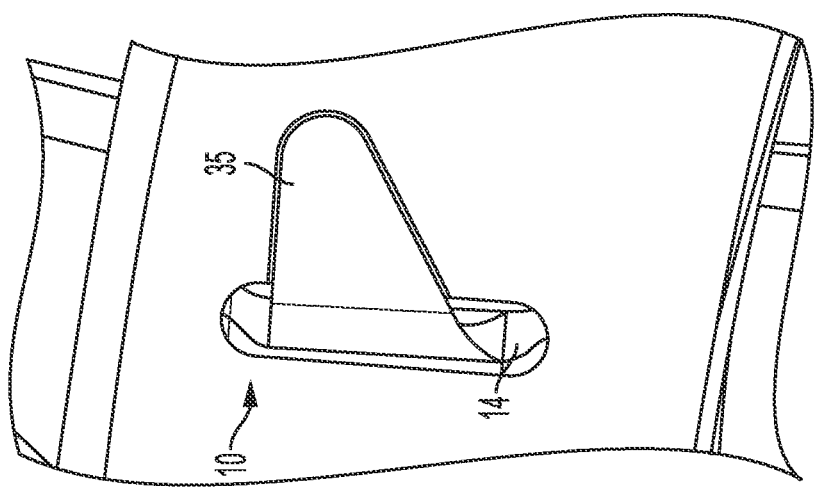
FIG. 5 is a magnified top view of the blade tip of the turbine engaged with the core ring.

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIGS. 1-9, a core ring 10 for a torque converter is disclosed. The core ring 10 includes a base ring having a circular profile. The core ring 10 includes through openings 14 each spaced from each other according to a predetermined pattern or profile. The through openings 14 are defined as windows or openings extending through the core ring 10 to define a passage.

Recesses 16 are also defined on the core ring 10. The recesses 16 can be defined as a pocket or cavity as opposed to a passage or through opening. The recesses 16 are each connected to a respective through opening 14. The recesses 16 are each configured to extend in a common circumferential direction from a respective one of the through openings 14. The recesses 16 only extend from a single circumferential side of a respective one of the through openings 14. One of ordinary skill in the art would understand that the recess 16 can be positioned in any area adjacent to the through openings 14.

The recesses 16 each have a predetermined profile that is configured to receive a portion of a blade 30. In one aspect, that portion of the blade 30 includes a blade tip 35. Each of the recesses 16 can include a first flank 16a and a second flank 16c connected via a medial portion 16b. The first flank 16a and the second flank 16c can have a straight profile. The medial portion 16b can have a curved profile. One of ordinary skill in the art would understand that the recesses 16 can have varying profiles depending on the shape of the blade tip 35. The recesses 16 can generally have a first profile, and the blade tip 35 can generally have a second profile that is complementary to the first profile. The recesses 16 are slightly larger than the blade tips 35 such that the blade tips 35 can be nested inside of the recesses 16.

Figure 6:
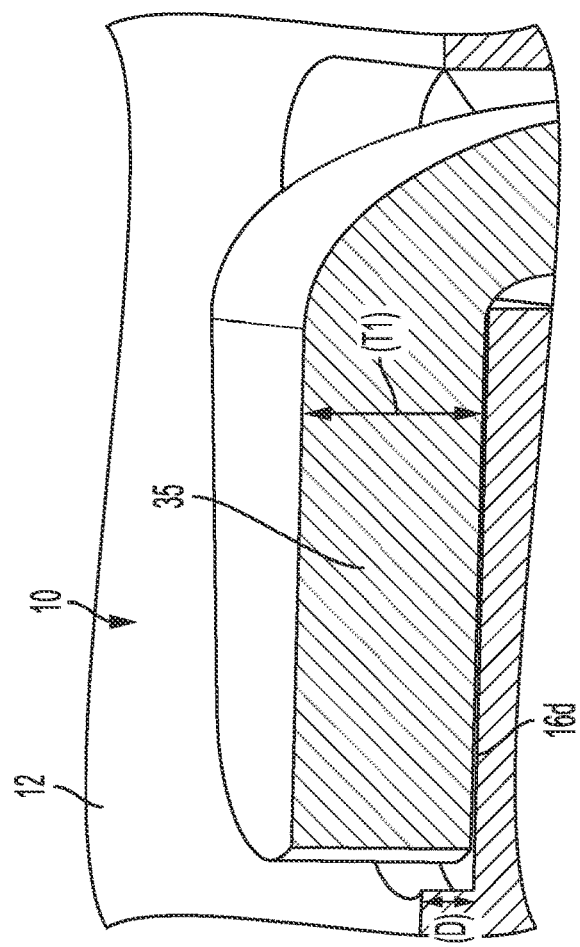
FIG. 6 is a side cross-sectional view of the blade tip and the core ring in a fully assembled state.
Figure 8:
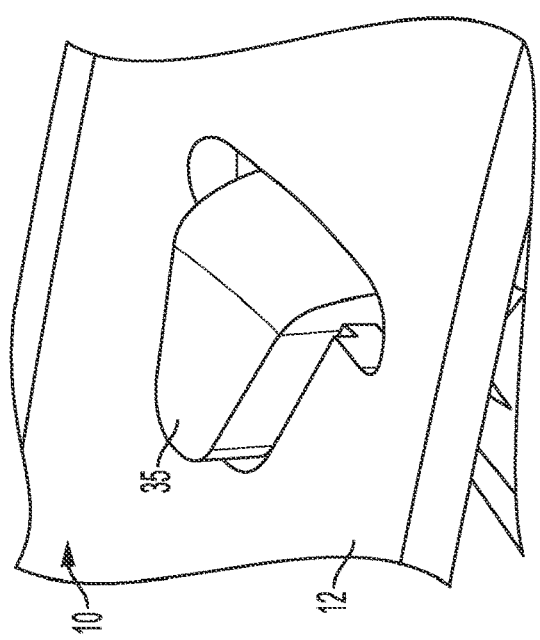
FIG. 8 is a top perspective view of the blade tip and the core ring in a fully assembled state.
Figure 9:
FIG. 9 is a side view of the core ring and the turbine.

Referring to FIG. 6, a thickness (T1) of the blade tip 35 is shown relative to a depth (D) of the recess 16. The depth (D) of the recess 16 can be 10% -35% of the thickness (T1) of the blade tip 35. In one aspect, the depth (D) of the recess 16 is 0.10 mm-0.60 mm. In one aspect, the thickness (T1) of the blade tip 35 is 1.20 mm-1.40 mm. The depth (D) of the recess 16 can be approximately 10%-30% of an overall thickness (T2) of the core ring 10. The depth (D) of the recess 16 can be approximately 15%-25% of an overall thickness (T2) of the core ring 10, in another aspect. One of ordinary skill in the art would understand that these values can vary depending on the particular requirements of an application.

In an engaged or installed state, the blade tip 35 is configured to extend 0.60 mm-1.25 mm in an axial direction above an axial surface 12 of the core ring 10. In one specific embodiment, the blade tip 35 is configured to extend less than 1.25 mm above the axial surface 12 of the core ring 10. The axial surface 12 is defined relative to a base portion of the core ring 10, and is defined as the axial surface positioned away from the recesses 16.

A torque converter assembly is disclosed herein that includes the core ring 10 described above, as well as a secondary component, such as a turbine, impeller, pump, etc. In one specific aspect, the secondary component is a turbine 20. However, the configuration disclosed herein can be adapted for any component configured to be attached or connected with the core ring 10.

Figure 4:
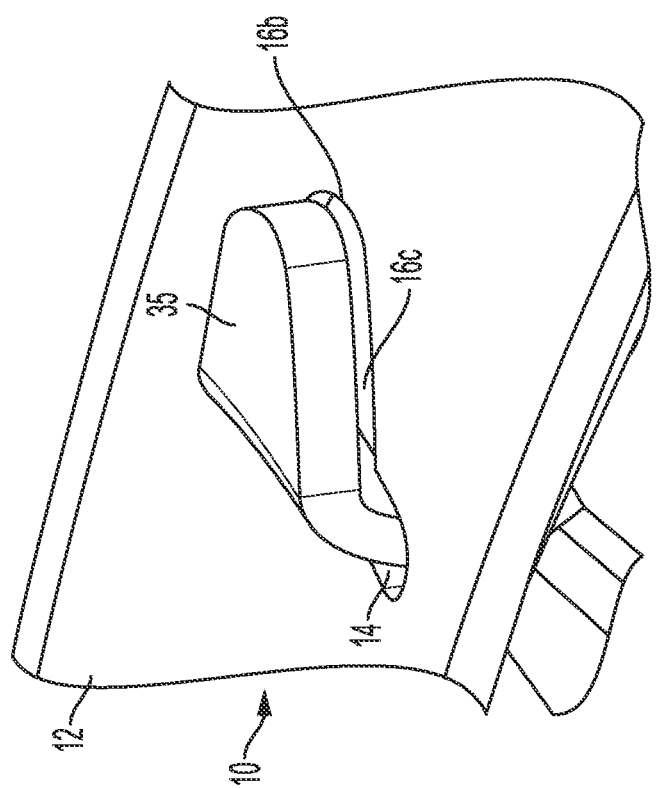
FIG. 4 is a magnified perspective view of a blade tip of the turbine engaged with the core ring in a partially assembled state.
Figure 7:
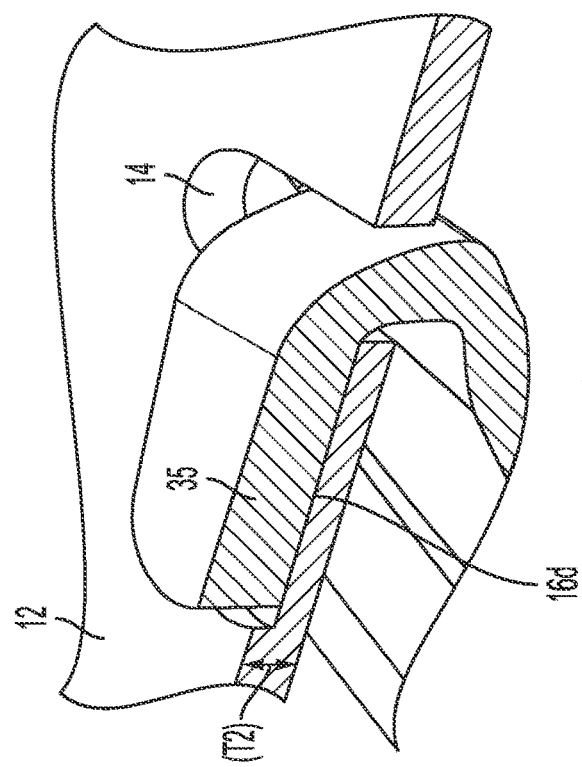
FIG. 7 is a top perspective cross-sectional view of the blade tip and the core ring in a fully assembled state.

The turbine 20 includes blades 30 that are each spaced apart from one another in a circumferential direction. The spacing of the blades 30 corresponds to the spacing of the through openings 14 on the core ring 10. The blades 30 include blade tips 35 each configured to extend through a respective one of the through openings 14. The blade tips 35 are of a sufficient length or extent such that the blade tips 35 are configured to be received within a respective one of the recesses 16 and subsequently bent over. The blade tips 35 are each configured to engage against an axial surface 16d of the plurality of recesses 16 in a fully bent state or installed state. Referring to the FIG. 4, the blade tip 35 is shown in a partially bent configuration, and the blade tip 35 is shown in a fully bent configuration in FIGS. 6-9. As shown in FIG. 4, there is a slight gap between the blade tip 35 and the axial surface 16d of the recess 16, while in FIGS. 6-9 the blade tip 35 is fully contacting or abutting the axial surface 16d of the recess 16.

A method of assembling a torque converter assembly is also disclosed herein. The method includes arranging a core ring 10 adjacent to a turbine 20. The core ring 10 includes through openings 14 and also includes recesses 16 that are each connected to a respective through opening 14. The turbine 20 includes blades 30 each having a blade tip 35. The method includes inserting the blade tips 35 into a respective one of the through openings 14 and bending the blade tips 35 such that the blade tips 35 are at least partially received within a respective one of the recesses 16. The method can further include fully bending the blade tips 35 such that the blade tips 35 fully engage against an axial surface 16d of the plurality of recesses 16.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

Log of Reference Numerals
core ring 10
axial surface 12 of the core ring
through openings 14
recesses 16
first flank 16a of recesses
medial portion 16b of recesses
second flank 16c of recesses
axial surface 16d of recesses
turbine 20
blades 30
blade tips 35

What is claimed is:

1. A core ring for a torque converter, the core ring comprising:
a plurality of through openings;
a plurality of recesses each connected to a respective through opening of the plurality of through openings, the plurality of recesses each being dimensioned to receive a portion of a blade;
wherein a depth (D) of each of the plurality of recesses is 10%-30% of an overall thickness (T2) of the core ring.

2. The core ring according to claim 1, wherein the plurality of recesses are each configured to extend in a common circumferential direction from a respective one of the plurality of through openings.

3. The core ring according to claim 1, wherein each of the plurality of recesses includes a first flank and a second flank connected therebetween via a medial portion.

4. The core ring according to claim 3, wherein the first flank and the second flank each have a straight profile.

5. The core ring according to claim 3, wherein the medial portion has a curved profile.

6. The core ring according to claim 1, wherein the portion of the blade includes a blade tip.

7. The core ring according to claim 6, wherein each of the plurality of recesses has a first profile, and the blade tip has a second profile that is complementary to the first profile.

8. The core ring according to claim 6, wherein the depth of the plurality of recesses is between 10%-35% of a thickness of the blade tip.

9. The core ring according to claim 6, wherein in an installed state, the blade tip is configured to extend less than 1.25 mm in an axial direction above an axial surface of the core ring.

10. A torque converter assembly comprising the core ring according to claim 1, and further comprising:
a turbine including a plurality of blades defining a plurality of blade tips configured to extend through a respective one of the plurality of through openings, wherein the plurality of blade tips are configured to be bent and received within a respective one of the plurality of recesses.

11. The torque converter assembly according to claim 10, wherein the plurality of blade tips are each configured to engage against an axial surface of the plurality of recesses.

12. The torque converter assembly according to claim 10, wherein the plurality of recesses each have a profile that is complementary to the plurality of blade tips.

13. A core ring for a torque converter, the core ring comprising:
- a plurality of through openings;
- a plurality of recesses each connected to a respective through opening of the plurality of through openings, the plurality of recesses each being dimensioned to receive a portion of a blade;
- wherein the portion of the blade includes a blade tip; and
- wherein a depth of the plurality of recesses is between 10%-35% of a thickness of the blade tip.

14. A method of assembling a torque converter assembly, the method comprising:
- arranging a core ring adjacent to a turbine, wherein the core ring includes a plurality of through openings and a plurality of recesses each connected to a respective through opening of the plurality of through openings, and the turbine includes a plurality of blades and a plurality of blade tips, wherein a depth (D) of each of the plurality of recesses is 10%-30% of an overall thickness (T2) of the core ring;
- inserting the plurality of blade tips into a respective one of the plurality of through openings; and
- bending the plurality of blade tips such that the plurality of blade tips are at least partially received within a respective one of the plurality of recesses.

15. The method according to claim 14, wherein the plurality of blade tips are each bent to engage flat against an axial surface of the plurality of recesses.

16. The method according to claim 14, wherein each of the plurality of recesses includes a first flank and a second flank connected therebetween via a medial portion.

17. The method according to claim 16, wherein the first flank and the second flank have a straight profile, and the medial portion has a curved profile.

18. The method according to claim 14, wherein the depth of the plurality of recesses is between 10%-35% of a thickness of the plurality of blade tips.

19. The method according to claim 14, wherein in an installed state, the plurality of blade tips are configured to extend less than 1.25 mm in an axial direction above an axial surface of the core ring.

* * * * *